United States Patent [19]

Geist et al.

[11] Patent Number: 5,318,273
[45] Date of Patent: Jun. 7, 1994

[54] GATE ASSEMBLY FOR IRRIGATION PIPES

[75] Inventors: Joseph Geist; Gerald H. Kroeker, both of Lincoln; Bernard L. Brehm, Malcom, all of Nebr.

[73] Assignee: Geist, Inc., Lincoln, Nebr.

[21] Appl. No.: 2,638

[22] Filed: Jan. 11, 1993

[51] Int. Cl.[5] ............................................. F16K 3/28
[52] U.S. Cl. ..................................... 251/145; 137/315
[58] Field of Search .................. 251/145, 146; 137/15, 137/315

[56] References Cited

U.S. PATENT DOCUMENTS

| 2,734,713 | 2/1956 | Webster | 251/145 |
| 2,918,251 | 12/1959 | Epp | 251/145 |
| 3,166,290 | 1/1965 | Sherman | 251/145 |
| 3,327,990 | 6/1967 | Hohnstein | 251/145 |
| 3,455,533 | 7/1969 | Epp | 251/145 |
| 3,989,224 | 11/1976 | Kroeker | 251/145 |

Primary Examiner—A. Michael Chambers
Attorney, Agent, or Firm—Kokjer, Kircher, Bowman & Johnson

[57] ABSTRACT

A gate for irrigation pipes adapted to be moved between open and closed positions over an opening in the pipe. The gate includes a carrier plate having a sealing boot around its periphery which will engage with the interior of the pipe. A slide member engages the exterior of the pipe and is connected to the carrier plate by a plastic screw. The screw includes long pitch square threads so that the slide member and carrier plate may be quickly drawn together for installation or adjustment. The screw head is received in a circular recess in the slide member. As the screw is tightened a pair of small buttons on the underside of the screw head interact in ratcheting fashion with ridges formed in the recessed area of the slide member to prevent the screw from loosening in service. The recessed area is formed at an angle such that the screw head engagement tends to place more pressure on one end of the gate, which is further from the screw. The screw head includes a pair of spaced opposed walls which define a slot. The screw may be turned by use of a screwdriver or coin in the slot, or by engaging the exterior of the walls manually or with pliers. A diffusion adapter allowing attachment of a diffusion sock to prevent erosion may be removably secured to the gate without removing the gate or screw.

14 Claims, 2 Drawing Sheets

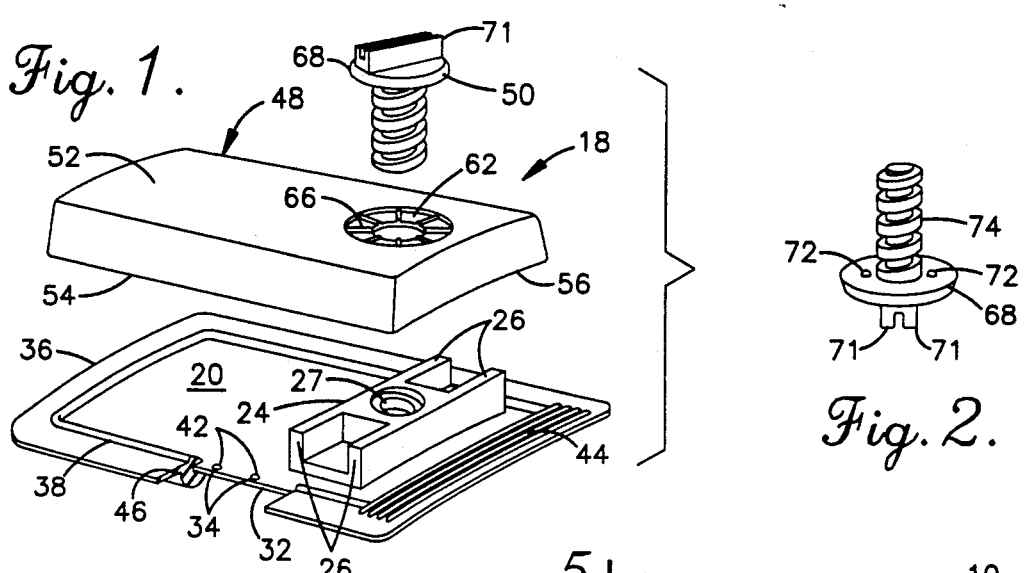
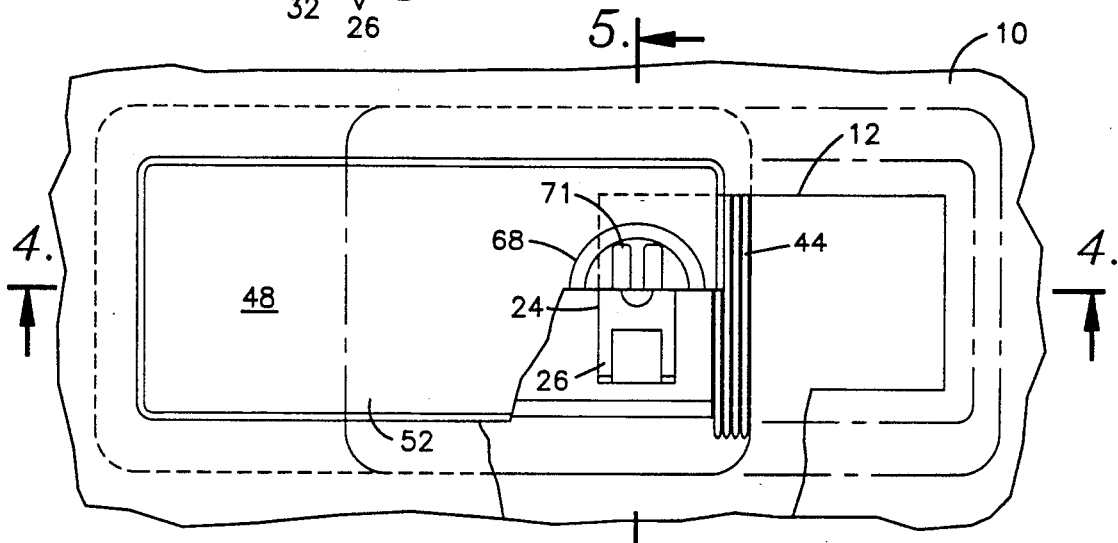
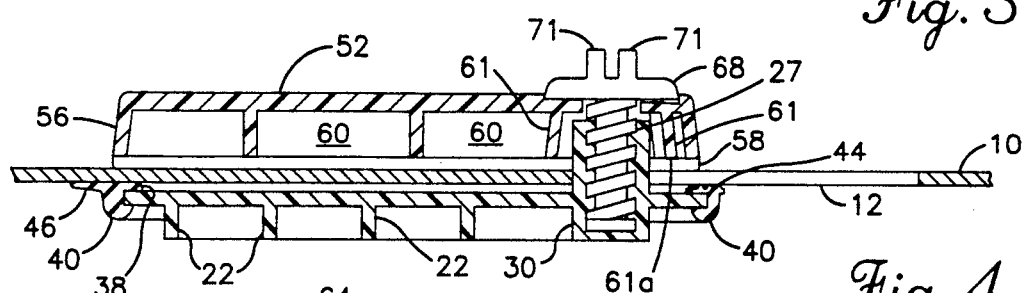
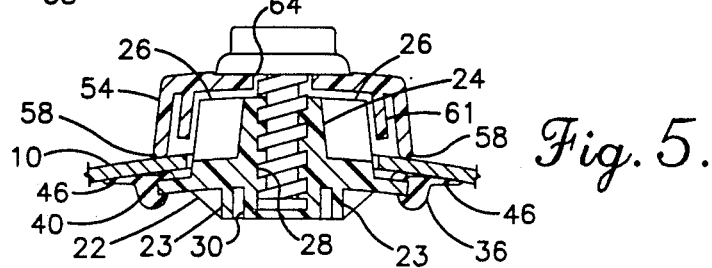

GATE ASSEMBLY FOR IRRIGATION PIPES

BACKGROUND OF THE INVENTION

1. Field of the Invention

This invention relates in general to crop irrigation. In particular, it relates to gates which are used to open and close outlet openings in irrigation pipe.

2. Description of the Related Art

In the irrigation of crops it is known to move the water into the fields through irrigation pipes, which typically have a circular cross section. At spaced points along these pipes openings are formed to allow the water to escape therefrom. To allow the fields to be selectively irrigated, these openings are provided with gates which may be opened and closed as desired. Examples of such gates are shown in U.S. Pat. Nos. 2,918,251, 3,455,533 and 3,989,224.

These patents show sliding gates which may be moved between extreme open and closed positions to control the discharge of water through the outlet openings of the irrigation pipes. Although this type of gate has performed in a generally satisfactory manner, it has not been wholly without problems.

In gates which have components formed of plastic or aluminum, the use of metal screws to maintain the component together have been a particular problem. Such screws corrode and tend to lock within the components, eliminating the ability to adjust or use the gates. In such situations the gate components typically must be broken to remove them from the irrigation pipe.

Additionally, where the gate components are formed of plastic, the metal screws tend to cut and otherwise damage the plastic threads. The result is a failure in the holding ability of the screw, which in turn causes leakage because the sealing element of the gate is not firmly held against the inside of the pipe wall. It is also not uncommon for the screw to loosen in service, creating similar leakage problems.

Gates in which the components are snapped together avoid the problems associated with metal screws, yet are subject to improper tolerances and size variations in service, causing leakage, and also are susceptible to separation when subjected to external forces. Also, this type of gate cannot be accurately adjusted as to the tightness with which it is held against the pipe.

Another problem with the gates that are currently available is their relatively high cost and their lack of versatility.

SUMMARY OF THE INVENTION

An object of the present invention is to provide an economical gate for irrigation pipes which provides a reliable seal.

Another object of the present invention is to provide the screw and gate with a ratchet mechanism to help prevent unintended loosening of the screw and clamping action of the gate on the pipe, and to provide the screw with a head which may be easily turned with a number of tools.

A further object of the present invention is to provide a gate of the character described in which a sealing boot is securely and reliably molded onto a carrier plate, to guard against leakage.

Yet another object is to provide a sock attachment for use with gates. The sock attachment will be easily attached and removed without removing the screw, and easily allow attachment of a sock or soaker hose to receive, and diffuse, the flow of water from the pipe.

These and other objects are achieved by a gate for irrigation pipes adapted to be moved between open and closed positions over an opening in the pipe. The gate includes a carrier plate having a sealing boot around its periphery which will engage with the interior of the pipe. A slide member engages the exterior of the pipe and is connected to the carrier plate by a plastic screw. The screw includes long pitch square threads so that the slide member and carrier plate may be quickly drawn together for installation or adjustment. The screw head is received in a circular recess in the slide member. As the screw is tightened a pair of small buttons on the underside of the screw head interact in ratcheting fashion with ridges formed in the recessed area of the slide member. Once the screw has been fully tightened, the interaction between the buttons and ridges prevents the screw from loosening in service. The recess is formed at an angle such that the screw head engagement tends to place more pressure on the end of the gate most remote from the screw. This is to improve the clamping action and stabilize the gate in a selected setting. The screw head includes a pair of spaced opposed walls which define a slot. The screw may be turned by use of a screwdriver or coin in the slot, or by engaging the exterior of the walls manually or with pliers. A sock or soaker hose attachment may be removably secured to the gate without removing the gate or screw.

BRIEF DESCRIPTION OF THE DRAWINGS

In the accompanying drawings which form a part of the specification and are to be read in conjunction therewith, and in which like reference numerals are used to indicate like parts, in the various views:

FIG. 1 is an exploded perspective view in partial cutaway of a gate assembly constructed according to a preferred embodiment of the present invention;

FIG. 2 is a perspective view of the screw of FIG. 1;

FIG. 3 is a top plan view in partial cutaway showing the gate assembly installed on an irrigation pipe;

FIG. 4 is a cross-sectional view along line 4—4 of FIG. 3;

FIG. 5 is a cross-sectional view along line 5—5 of FIG. 3;

DETAILED DESCRIPTION OF THE INVENTION

Figure 6:
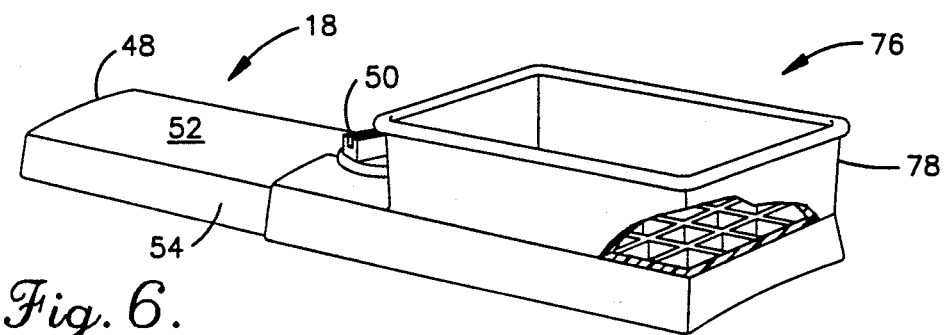
FIG. 6 is a perspective view in partial cutaway of the gate of the present invention in combination with a sock holder according to the present invention.

Referring now to the drawings in more detail, numeral 10 designates a cylindrical irrigation pipe which is shown only fragmentarily. The irrigation pipe 10 is typically between 6 and 12 inches in diameter and connects end to end with similar pipes to provide a continuous flow passage for irrigation of the field in which the pipe is laid. Each pipe is provided in its side with a plurality of outlet openings 12 through which the water is discharged into the field. These openings may have various peripheral configurations, such as circular and keyhole, however for purposes of the present description a substantially rectangular opening is shown, as best seen in FIGS. 3-5.

Numeral 18 generally designates a sliding gate assembly which controls the outlet opening 12 in the irrigation pipe. The gate assembly 18 includes a rigid plastic carrier plate 20 which is positioned within the interior of the pipe. For use with the rectangular opening 12, the carrier plate 20 is generally rectangular, is of a slightly greater size than the opening, and has a slight curvature between the lateral sides to substantially conform with the curvature of the irrigation pipe 10, as best shown in FIG. 5.

The inner side of the plate 20, which faces away from the pipe outlet opening 12, is provided with a series of transverse ribs 22 and with a pair of longitudinal ribs 23, both for reinforcement. The outer side of plate 20, which faces the pipe wall, is provided with a generally square block 24 extending outwardly therefrom. As will be explained more fully below, the block is located closer to a first longitudinal end of the carrier plate than to a second longitudinal end. A pair of ribs 26 extend laterally from block 24 by a total length which is slightly less than the width of the opening 12, as best shown in FIG. 5. The ribs 26 are preferably formed integrally with block 24.

In operation the block ribs 26 extend through the opening 12 to permit the carrier plate 20 to slide axially in the pipe. However, the close fit of the ribs, and the longitudinal spacing of the ribs prevents the carrier plate 20 from turning with respect to the pipe about an axis perpendicular to the longitudinal axis of the pipe. This assures that the carrier plate will take the proper orientation to block the opening 12.

Block 24 includes a substantially cylindrical cavity extending thereinto. At a position spaced inwardly from the opening of the cavity there are formed internal screw threads 28. This spacing will be explained below, and is an advantage of the present invention. The screw threads continue to the bottom of cavity 27, which extends through block 24 and plate 20 and continues into a cylindrical boss 30, which essentially forms a continuation of block 24 on the opposite side of the carrier plate 20. The threads of the screw passage 28 have a relatively long pitch, as will be explained more fully below. Preferably, the carrier plate is molded as a monolithic piece from a rigid plastic material.

As best shown in FIG. 1, the periphery of the carrier plate 20 is formed by four edges, one of which is designated by numeral 32. A plurality of spaced apart pin holes 34 are formed through the carrier plate 20 to extend generally along each edge somewhat inwardly thereof.

A flexible boot 36 is carried on the carrier plate 20 and serves to seal against the inside surface of the pipe 10. The boot 36 is constructed of a deformable, resilient material such as rubber which is able to effectively seal against the pipe wall. The flexible boot 36 preferably is molded to the carrier plate 20 and envelops each of the edges 32, with a portion of the material which forms the boot extending through the pin holes 34. This ensures a positive lock between the boot and carrier plate.

On the outer side of plate 20, which faces the pipe, the boot 36 presents a bead 38 which extends parallel to the edges 32 on both lateral sides and a second longitudinal end of the carrier plate 20. The bead 38 immediately overlies the pin openings 32. A larger bead 40 is formed on boot 36 on the inner side of the carrier plate.

Pin portions 42 of the boot 36 extend through the pin holes 34 between the two beads 38 and 40. As noted above, the boot 36 is molded directly onto the edge portions of the carrier plate 20, and the rubber material flows through the pin holes 34 during the molding process. This material is integral with the remainder of the boot 36 and serves to permanently secure the boot on the carrier plate.

A plurality of parallel ridges 44 are formed in place of the bead 38 on the boot at a first end of carrier plate 20. As best shown in FIGS. 3-5, the bead 38 and ridges 44 may seal against the inside surface of the irrigation pipe wall during service of the gate. The boot 36 has tapered flanges or fins 46 which extend laterally outwardly and slightly upward (toward the pipe wall) from both lateral sides of the boot and the second end to assist in sealing against the pipe. The first end, having the ridges 44, does not have a fin, as this would interfere with water flow. The boot 36 extends only on the edge portions of the carrier plate 20 where it is needed to provide a seal around the outlet opening 12 of the irrigation pipe. This reduces the amount of rubber required to form the gate.

A slide member 48 is placed in contact with the exterior of the irrigation pipe 10 and is connected with the carrier plate 20 by a plastic screw 50. The body of the slide member 48 may take many forms, but is preferably in the form of a generally rectangular plate 52 which is arched from lateral side to side to substantially conform with the curvature of the irrigation pipe. Side walls 54 and end walls 56 extend downward (toward the pipe) from the lateral sides and longitudinal ends of plate 52. The side walls 54 terminate in rounded edges 58 (FIG. 5) which serve as runners which slide back and forth along the outside surface of the pipe 10, and project beyond the free edges of the end walls 56.

The side of plate 52 which faces the irrigation pipe is provided with a series of intersecting ribs 60 which extend both longitudinally and transversely on the slide member 48, stiffening the slide member. The ribs, at least adjacent a first longitudinal end of the plate, are spaced to define a cavity of a size to closely receive the block 24 and ribs 26, and which will include the hole 64 substantially in the center thereof. Alternatively, the ribs could be located as is best for stiffening the slide member, and be interrupted by box walls 61 which define the cavity to receive the block 24 and ribs 26. The walls may be located to closely receive the block 24 and ribs 26 themselves, or one or more of the walls could be provided with protrusions 61a (FIG. 4) which will abut against the block 24 and ribs 26.

The outer surface of plate 52 near the first longitudinal end is provided with a circular recess in which an annular surface 62 is presented. A round screw opening 64 is formed through plate 52 in the center of the recessed area. A plurality of ridges 66 are formed on the recessed surface 62 and extend outwardly (away from the pipe) and radially from the opening 64 to the outside edge of surface 62. The ridges 66 are preferably circumferentially spaced equally apart from one another, and serve a purpose described below.

As is best shown in FIG. 4, the annular surface 62 forms an angle with respect to the rounded edges 58 and plane of the underside of the screw head. In particular, the side of the surface 62 closest to the first longitudinal end of the slide member is recessed a greater amount than the other end of the surface. The purpose for this angle will be explained below.

The slide member 48 is preferably molded as a monolithic unit from a rigid plastic material.

The screw 50 is formed from a tough plastic material and includes a circular head 68. While this head may include a standard slot for use with a screwdriver, it is preferred that the screw include a pair of spaced, opposed walls 71 extending longitudinally outward from the head. These walls will define a slot 70 for receiving a screw driver in the typical fashion. Additionally, the walls define a slot which is sufficiently deep that a coin may be employed to turn the screw. As a further advantage, the outer sides of the walls may be substantially flat, such that these outer walls may be grasped manually or by a pair of pliers to effect turning of the screw. With this arrangement the ease of operation of the device is greatly improved, as a number of different tools, one of which the worker is likely to have, may be used to rotate the screw.

The underside of the head of the screw is provided with one or more, and preferably two, rounded buttons 72, as best shown in FIG. 2. The buttons are spaced apart at diametrically opposed positions and interact with the ridges 66 to provide a ratcheting effect, as will be explained more fully below.

The shank of screw 50 has a single flight of square threads 74 which spiral around the screw shank and have a relatively long pitch. In a preferred form of the invention, the pitch is approximately 3/16 inch. The internal threads in the screw passage 28 have the same size and shape as threads 74 for proper mating.

The gate assembly 18 is installed on the irrigation pipe 10 by inserting the carrier plate 20 and the connected boot 36 through the opening 12. As the carrier plate will be slightly larger than the opening, the plate may be tilted at an angle to fit through the opening. The boot and carrier plate are then positioned with block 24 and ribs 26 of the carrier plate projecting outwardly through the opening. The provision of two ribs 26 spaced in the longitudinal direction assures that the carrier plate will be properly oriented with respect to the opening, and not rotated about an axis perpendicular to the longitudinal axis of the pipe.

The slide member 48 is then applied to the outside surface of the pipe, such that the block 24 and ribs 26 are received within the cavity on the underside of the slide member 48. The screw 50 is next passed through opening 64 and into cavity 27. The spacing between the opening of cavity 27 and the beginning of the interior threads assures that the free end of the screw may be easily located within the cavity 27, reducing assembly time. The screw is then rotated with one of a number of possible tools, or manually, to engage the mating threads and connect the slide member with the carrier plate.

As best shown in FIGS. 4 and 5, the two walls 61 fit closely outside of block 24 and ribs 26 to prevent the slide member 48 from twisting or turning relative to the carrier plate 20. As the screw 50 is advanced into cavity 27 by means of a screw driver or similar tool, the screw head 68 approaches the annular recessed surface 62. As the screw is further tightened, the buttons 72 come into contact with surface 62 and begin to ride up and over ridges 66 in ratcheting fashion. When screw 50 has been fully tightened the boot 36, and particularly the bead 38 and ridges 44, are drawn against the inside surface of the pipe, the edges 58 are firmly drawn up against the outside surface of the pipe, and the buttons 72 are pulled tightly against the recessed surface 62 between the ridges 66.

Loosening of the screw 50 requires that it be turned with sufficient force to cause the buttons 72 to ride over the ridges 66. The external forces that are applied during ordinary service of the gate are insufficient to accomplish this, and the screw will not be inadvertently backed off. Consequently, the ratchet effect provided by the cooperating buttons 72 and ridges 66 maintain screw 50 in place and assure that the gate components will remain tightly fastened together to maintain an effective seal between the boot 36 and the inside surface of the pipe wall and to stabilize the gate against movement from its selected fusion.

An effective tight seal is also assured by the angular orientation of the recessed surface 62 with respect to the underside of the screw head. In particular, the screw connection between the slide member and carrier plate is effected at a position closer to the first end than the second end of these members. As such, the second ends tend to be drawn together with less force than the first ends. By use of the angular orientation of surface 62, however, the underside of screw head 68 will abut against the most raised portion of the recessed area first and with the greatest pressure. This most raised portion is that directed toward the second ends of the slide member and carrier plate, and thus the second ends are held together with a greater force than if the recessed surface were parallel to the pipe surface, aiding in the sealing of the opening.

Sliding movement of the gate 18 parallel to the longitudinal axis of the pipe opens and closes the outlet opening 12. More particularly, the opening may be substantially opened by moving the gate to the position shown in solid lines in FIG. 3, or it can be fully closed by moving the gate to the closed position shown in dashed lines in FIG. 3. Any desired intermediate flow may be achieved by setting the gate between the fully open and fully closed positions. For allowing movement of the gate, the screw 50 is first loosened slightly by means of a screw driver, coin, pliers, or manually. The block 24 and ribs 26 engage the edges of the opening 12 to guide the gate as it slides between the open and closed positions, and the rounded edges 58 slide upon the exterior of the pipe.

In the fully closed position of the gate the block 24 abuts against a first end of the opening 12 and boot 36 seals against the inside surface of pipe 10 around the entire periphery of opening 12 in order to prevent any water from discharging through the opening. When the gate is slid to the fully open position, block 24 abuts against a second end of the opening 12 to provide a limiting position of the gate. The placement of the block closer to the first end allows the gate to be opened wider than if the block were centered on the plate.

The use of a plastic screw 50 permits all parts of the gate to be constructed of non-corroding materials to eliminate the problem of corrosion. The ratchet mechanism prevents the screw from inadvertently backing out, although the screw can be easily loosened when necessary. The gate is fully adjustable in that the screw 50 can be tightened to pull the gate components as tightly as desired against the pipe to accommodate varying water pressures. The gate can be fitted on either metal or plastic irrigation pipe, and the permanent molding of the boot 36 on the edge of the carrier plate 20 assures that the boot will remain on the carrier plate.

The relatively long pitch of the screw thread 74 permits the screw to be fully tightened with only 1-2 turns required. This expedites installation of the gate on the pipe. Since the screw threads 74 are plastic, they are fully compatible with the internal threads in the screw passage 28 and will not cut or otherwise damage the internal threads as can occur with metal screws. Square threads or modified square threads are preferred because they are able to hold the gate components together more firmly than other types of threads, due to threads providing load surfaces which are substantially perpendicular to the forces applied.

While a particular arrangement for the gate has been described above, various modifications should be apparent to those skilled in the art.

For example, the opening may have a generally circular configuration, with a rectangular slot or keyway extending outwardly therefrom. A gate to be employed with such an opening would have the block 24 and ribs 26 reduced to an appropriate size to fit within the keyway slot, and the position of the block and ribs, and thus the screw 50, varied longitudinally of the gate to allow the opening to be fully closed while the block and ribs are still within the keyway slot, yet provide the utmost open condition for the opening when the block is located at the opposite extreme within the keyway. In such a situation, the block and ribs and screw may be located near the longitudinal midpoint of the gate, rather than situated adjacent the first end of the gate. Other configurations for other opening arrangements are believed to be apparent or known in the art.

Regardless of the particular configuration of these parameters, the inventive aspects according to the present invention may still be applied. For example, the screw may still be provided with the opposed walls 71 and bumps 72 to provide a ratchet with the ridges 66. Similarly, the screw may be formed of plastic with large square threads having a relatively long pitch, and the recessed surface 62 may be formed at an angle with respect to the exterior of the pipe to provide an increased clamping force on one or the other of the longitudinal ends of the gate, as needed.

While the irrigation gate described above will reliably open and close the opening 12 in the pipe 10, when the gate is in an open position the water from the pipe will exit therefrom, possibly causing erosion of the soil or non-uniform watering conditions (with much more water being absorbed adjacent the pipe than at a distance from the pipe). To overcome this, the present invention also encompasses means for causing diffusion of the water flow exiting the pipe.

Figures 7, 8:
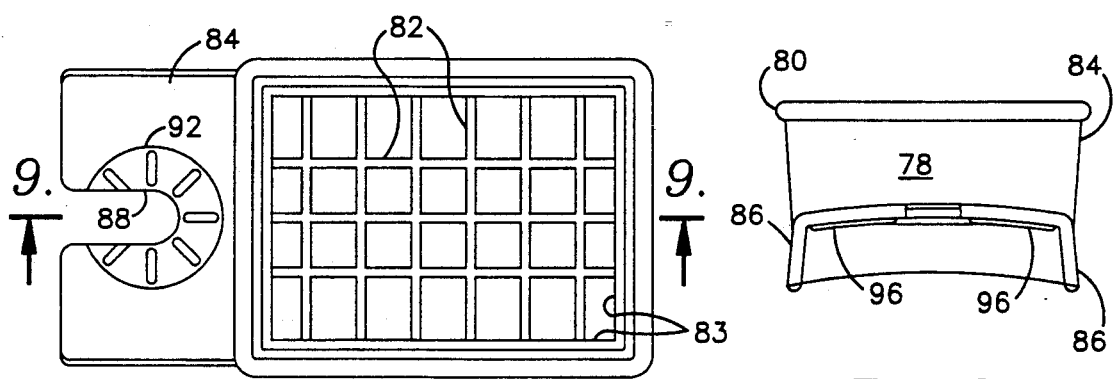
FIG. 7 is a top view of the sock holder of FIG. 6.
FIG. 8 is a front view of the sock holder of FIG. 6.
Figure 9:
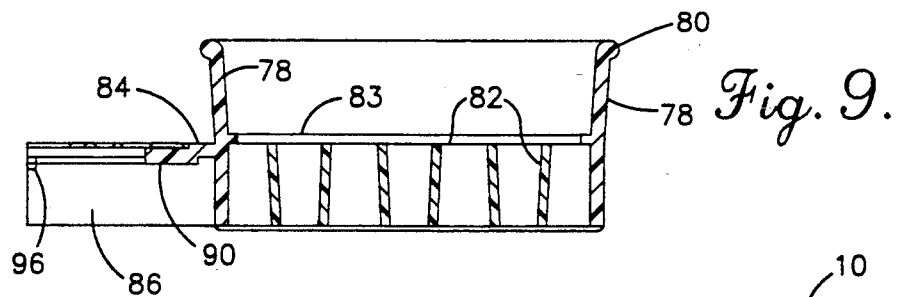
FIG. 9 is a cross-sectional view along line 9—9 of FIG. 7.

This means takes the form of a diffusion adapter 76, best shown in FIGS. 6-10, used in combination with a gate assembly. The adapter 76 includes a plurality of side walls 78 having a size and configuration adapted to substantially surround the opening 12 in the pipe 10. In the operative position, the side wall 78 will extend substantially radially outward from the pipe 10. As is best shown in FIGS. 8 and 9, the upper edge of the side walls 78 include an outwardly extending lip 80 for a purpose described below. The lower edge of the sidewalls may include rounded edge portions, similar to edges 58, to improve sliding of the adapter.

Within the periphery of the side wall 78 the adapter may include a plurality of diffuser ribs 82 which aid in maintaining the side walls in the proper configuration, and also serve to diffuse water exiting from the opening 12. As shown in FIGS. 6 and 7, the ribs may extend in more than one direction, such as mutually perpendicular, to define a grid. Other arrangements and configurations of the diffuser ribs are of course possible for different diffusion patterns.

To allow such different diffusion patterns to be more easily achieved, the diffuser ribs may be removable and replaceable from the side walls. In such an arrangement there will be provided an interior ledge 83 extending inward about the periphery of the sidewalls. This ledge will act as an abutment for a modular diffusion grid formed of the ribs 82. The outer periphery of the modular grid will have a size to form a close sliding fit within the sidewalls, such that it will be releasably retained in the operative position of FIG. 9 by friction and abutment against the ledge 83. The modular grids will allow a single adapter to be used with one of several possible diffusion grids best suited for a particular application, eliminating the need for multiple adapters having different grids.

Extending outwardly from one of the side walls is an attachment flange 84. The flange 84 is substantially parallel to the bottom edge of the side walls 78, and is spaced from this bottom edge by a distance substantially corresponding to the height of the slide member 48. As is best shown in FIG. 8, the flange 84 includes a width and slight curvature such that it will substantially conform to the rectangular plate 52 of slide member 48. To ensure the proper position of the attachment flange on the plate 52, the attachment flange may include downward extending side ribs 86 which will engage against the side walls 54 of the slide member 48.

Attachment of the adapter 76 to the slide member 48 is effected by use of the screw 50. To allow this, the attachment flange 84 includes a centrally located slot 88 having a width slightly greater than that of the square threads 74 on the screw 50. As such, the screw 50 may be loosened (but not removed from threaded engagement) from the position shown in FIGS. 4 and 5, and the attachment flange 84 slid beneath the head 68 of the screw. Thereafter, tightening the screw will maintain the adapter 76 in place. The side ribs 86 will ensure that the adapter is longitudinally aligned with the slide plate. The attachment of the adapter to the slide member is best shown in FIG. 6, although the adapter is slightly spaced from the slide member in this view to show the location of the screw 50. In normal operation the side wall from which the attachment flange extends would typically abut against the end wall of the slide member.

To further secure the adapter 76 in position, the bottom side of the attachment flange 84 may include a mating protrusion 90 having a size and configuration to be closely received within the recess in which annular surface 62 is presented. The protrusion 90 may have a substantially flat surface, or may include a plurality of radial grooves adapted to receive the ridges 66.

As with the annular surface 62, the upper face of the attachment flange 84 may include a recess 92 adapted to receive the head 68 of screw 50, with the recess 92 including a plurality of ridges 94 substantially corresponding to, and having the same purpose as, the ridges 66.

As the only connection of the adapter 76 to the pipe 10 is through the screw 50, it may be found that the end of the adapter furthest from the groove 88 may have a tendency to move away from the pipe 10. This will allow water to exit around the side wall 78, which is not preferred. To prevent such a lifting action, the attachment flange 84 may include an orientation rib 96 extending downward and laterally across its free end. The rib 96 will abut against the plate 52 of slide member 48, forcing the adapter to take an angled configuration with respect to slide member 48. In particular, the side wall 78 furthest from orientation rib 96 will be forced to a position slightly lower than that of the side wall 78 from which the attachment flange 84 extends. This will tend to force adapter into the proper position.

Figure 10:
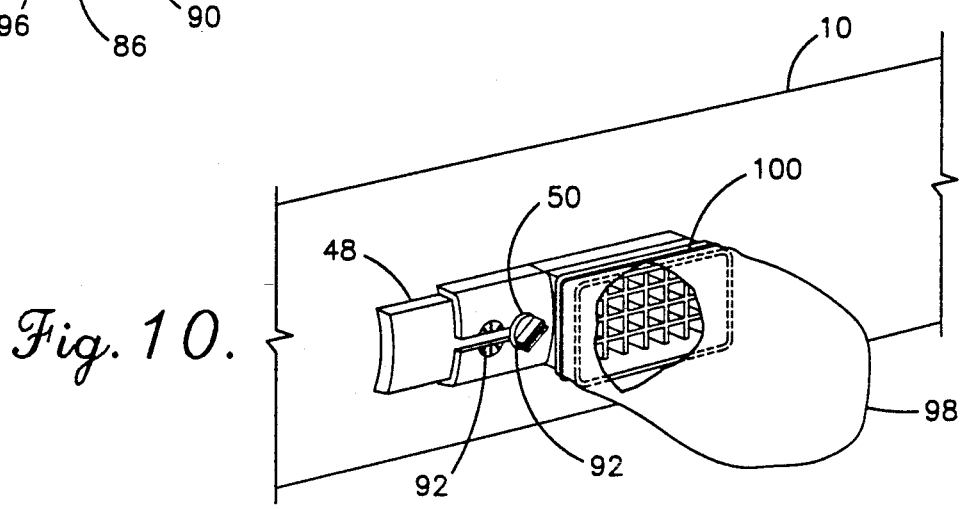
FIG. 10 is a perspective view in partial cutaway of a gate and sock holder of the present invention showing these elements mounted on an irrigation pipe.

As is best shown in FIG. 10, a sock 98 may be mounted to the adapter. The sock is formed of a material from which water may seep, which is resistant to nitrites or other chemicals which may be added to the irrigation water, and which is stable in prolonged exposure to sunlight. Polyester fabrics typically employed for use as bags for clippings from lawnmowers are good choices, preferably those having a "Rochelle" weave. The sock has the form of an elongated tube with one closed end, typically formed by a stitched or adhesive seam, and one opened end which may be easily attached to the adapter 76.

In particular, the open end of the sock 98 may be placed about the outer periphery of the side walls 78 and held in position. A separate securing member 100, such as a length of wire which extends about this end of the sock may be used to hold the sock in position, with the securing member acting in conjunction with the lip 80 to resist removal of the sock from the adapter.

Alternatively, the open end of the sock may be folded over and sewn to provide reinforcement and reduce expansive flexibility of the open end, and be formed with a peripheral length greater than that of the sidewalls 78, yet less than that of the lip 80. This would allow the open end to surround the sidewalls, yet not pass over the lip 80, securing the sock in position without the need for any additional elements. To place the sock in, and remove the sock from, this operative position, the adapter may be inserted into the sock with the sidewall opposite the attachment flange 84 leading. The adapter has a reduced cross-section in this orientation and may be easily inserted. While holding a portion of the open end of the sock on the exterior of the sidewall closest to the flange 84, the adapter is rotated to move that sidewall furthest from the flange in a direction toward the open end of the sock. This will allow the lower end of the sidewalls to pass out of the open end, and bring the open end adjacent the lip 80, fixing the sock in position. An opposite procedure will remove the sock from the adapter.

As may be readily envisioned, the adapter 76 may be quickly and easily attached to, and removed from, the slide member 48. This attachment and removal does not require the screw 50 to be fully removed from the gate assembly 18, such that the carrier plate 20 is never detached from the slide member 48. Where the gate assembly is moved to the fully closed position, the adapter 76 does not interfere with this action in any way. Additionally, the orientation ribs 96 may act in a manner similar to the angled surface of the annular surface 62, forcing the ends of the gate assembly furthest from the screw 50 together, providing a secure seal along the entire length of the gate assembly.

When the gate assembly is moved to an open or partially open position, the adapter 76 will be placed over the opening such that the water may pass through the side walls 78 and into the sock 98 for proper irrigation. The water entering the sock will seep through the material forming the sock. The seeping water will exit the sock in a diffused state compared to a pipe opening without a sock, and fall to the ground with reduced erosion effects. The sock will typically have a length such that it does not touch the ground, or touches only adjacent its free or outer end. While various sizes of socks may be used, it has been found very advantageous to provide a sock having a length of approximately 20.3 cm (8 in.) and a circumference of approximately 25.4 cm (10 in.). These dimensions, when the sock is formed of "Rochelle" weave polyester, provide improved diffusion characteristics compared to other dimensions.

As noted above, the gate assemblies 18 may have other configurations for use with openings having different peripheries. It should of course be understood that the adapter 76 could of course have different side wall configurations to correspond to such different opening peripheries. Additionally, the adapter 76 may be modified, as shown in FIG. 10, such that the attachment flange 84 extends a greater distance and includes a plurality of recesses 92, and possibly additional protrusions 90. These additional recesses will allow a single adapter 76 to be used with more than one type of gate assembly 18, in particular, gate assemblies in which the screws 50 are located at different distances from the end wall. This greatly increases the utility of the adapter, and may allow a single type of adapter to be employed in an irrigation system having two or more types of gate assemblies.

As noted above, the shapes and sizes of the openings may vary, and thus the particular configuration of the gate and adapter may vary. Various other modifications could also be made, such as forming the annular surface 62 with a periphery which is not annular.

From the foregoing, it will be seen that this invention is one well adapted to attain all the ends and objects hereinabove set forth together with other advantages which are obvious and which are inherent to the structure.

It will be understood that certain features, and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

What is claimed is:

1. In a gate assembly for controlling fluid flow through an outlet opening formed in the wall of an irrigation pipe, said gate assembly comprising:

a closure member adapted to be positioned inside of the irrigation pipe adjacent the outlet opening for movement between open and closed positions to respectively open and close the opening, said closure member having an internally threaded passage;

a slide member adapted to overlie the closure member on the exterior of the irrigation pipe, said slide member being formed of a rigid plastic and presenting a screw opening therein, said screw opening being surrounded by a surface; and a screw adapted to extend through said screw opening and thread into said internally threaded passage, and having an enlarged head for abutment against said surface of said slide member to connect said closure and slide members for movement together as a unit, said screw being formed of a rigid plastic to resist corrosion and avoid damaging the threads of said internally threaded passage, the improvement comprising:

said surface having at least a portion thereof oblique to said screw head such that said screw head abuts against said portion, upon tightening, prior to abutting against the remainder of said surface.

2. The improvement of claim 1, wherein said surface is substantially planar and forms an oblique angle with the longitudinal axis of said pipe, about a circumferential tangent line, when said slide member is positioned on the pipe.

3. The improvement of claim 1, further comprising cooperating surfaces on said screw head and said surface of said slide member adapted to interact in a manner to releasably retain said screw against turning in a direction to thread out of said passage once said screw is tightened to bring said cooperating surfaces into contact.

4. The improvement of claim 3, wherein said cooperating surfaces include:
a plurality of ridges on said surface of said slide member; and
at least one projection on an underside of said screw head interacting with said ridges in ratcheting fashion.

5. The improvement of claim 1, wherein said screw includes an enlarged head adapted to abut against said slide member, and a pair of substantially planar walls extending outwardly from said head, said walls being in spaced, opposed, substantially parallel relation and being substantially parallel to the longitudinal axis of said screw, whereby opposed faces of said walls define a slot adapted to allow insertion of a tool for turning of said screw and exterior faces of said walls allow clamping of said walls for turning of said screw.

6. The improvement of claim 5, further comprising cooperating surfaces on said screw head and said surface of said slide member adapted to interact in a manner to releasably retain said screw against turning in a direction to thread out of said passage once said screw is tightened to bring said cooperating surfaces into contact.

7. The improvement of claim 6, wherein said cooperating surfaces include:
a plurality of ridges on said surface of said slide member; and
at least one projection on an underside of said screw head interacting with said ridges in ratcheting fashion.

8. The improvement of claim 1, in combination with a diffusion adapter, said adapter comprising:
at least one peripheral side wall adapted to surround the opening of the pipe with said side wall extending substantially radially outward from the pipe, said side walls defining an interior through which irrigation water is capable of passing;
a peripherally outwardly extending lip along at least a portion of an end of said side wall intended to be radially exterior, said lip being adapted to receive an open end of an irrigation sock thereover;
an attachment flange extending peripherally outward from said side wall and adapted to be releasably secured between an enlarged head of said screw and said slide member.

9. A diffusion adapter for use with a gate assembly for controlling fluid flow through an outlet opening formed in the wall of an irrigation pipe, said gate assembly comprising a closure member adapted to be positioned inside of the irrigation pipe adjacent the outlet opening for movement between open and closed positions to respectively open and close the opening, a slide member adapted to overlie the outlet opening on the exterior of the irrigation pipe, and a screw adapted to connect said closure and slide members for movement together as a unit, said adapter comprising:
at least one peripheral side wall adapted to surround the opening of the pipe with said side wall extending substantially radially outward from the pipe, said side walls defining an interior through which irrigation water is capable of passing;
a peripherally outwardly extending lip along at least a portion of an end of said side wall intended to be radially exterior, said lip being adapted to receive an open end of an irrigation sock;
an attachment flange extending peripherally outward from said side wall and adapted to be releasably secured between an enlarged head of said screw and said slide member.

10. The adapter of claim 9, wherein said attachment flange includes a free end and a slot opening into said free end, said slot having a width smaller than that of said head of said screw and adapted to receive said screw.

11. The adapter of claim 10, wherein said attachment flange includes at least one portion adapted to be contacted by an enlarged head of said screw, each of said portions including a plurality of ridges adapted to engage with at least one projection on an underside of a head of the screw in ratcheting fashion.

12. The adaptor of claim 11, further including a plurality of reinforcing ribs extending across the interior of said side walls, said ribs acting as a diffusion grid for water flowing therethrough.

13. The adaptor of claim 9, in combination with a sock formed of water permeable material, said sock having a closed end and an open end, said open end mounted to said sidewall of said adapter in surrounding relation whereby water passing through said adapter will enter said sock through said open end and pass through said material forming said sock.

14. The combination of claim 13, further comprising a securing member passing about said open end of said sock to force said open end into engagement with said sidewall of said adapter.

* * * * *